United States Patent [19]

Bayles et al.

[11] 4,107,358

[45] Aug. 15, 1978

[54] METHOD FOR PRODUCING A MICA BASED INSULATION

[75] Inventors: Francis Derrick Bayles, Dollard des Ormeaux; Michael Alan Dudley, Toronto, both of Canada

[73] Assignee: Canada Wire and Cable Limited, Toronto, Canada

[21] Appl. No.: 736,852

[22] Filed: Oct. 29, 1976

Related U.S. Application Data

[63] Continuation-in-part of Ser. No. 488,408, Jul. 15, 1974, Pat. No. 3,989,875.

[30] Foreign Application Priority Data

Jun. 21, 1974 [CA] Canada .................................. 203081

[51] Int. Cl.² ........................ B32B 15/00; D02G 3/00

[52] U.S. Cl. .............................. 427/379; 260/37 SB; 528/10; 428/447; 428/454

[58] Field of Search ................ 427/379, 387; 428/447, 428/454; 260/46.5 E, 46.5 G, 37 SB

[56] References Cited

U.S. PATENT DOCUMENTS

| | | | |
|---|---|---|---|
| 2,791,262 | 5/1957 | Budnik | 427/379 |
| 3,146,799 | 9/1964 | Fekete | 260/46.5 G |
| 3,310,411 | 3/1967 | Vedder et al. | 427/379 |
| 3,388,092 | 6/1968 | Heying et al. | 260/46.5 E |
| 3,463,801 | 8/1969 | Papetti et al. | 260/46.5 G |
| 3,511,698 | 5/1970 | Talcott | 428/447 |
| 3,637,589 | 1/1972 | Kwasnik et al. | 260/46.5 E |
| 3,671,489 | 6/1972 | Barnes et al. | 260/46.5 E |
| 3,733,298 | 5/1973 | Knollmueller | 260/46.5 E |
| 3,840,393 | 10/1974 | Ishizaka et al. | 260/46.5 G |

FOREIGN PATENT DOCUMENTS

| | | | |
|---|---|---|---|
| 569,530 | 1/1959 | Canada | 260/46.5 G |

OTHER PUBLICATIONS

Schroeder, H. A., "Carboxansiloxane Polymers", Feb. 1969, pp. 58–64.

*Primary Examiner*—Morris Kaplan
*Assistant Examiner*—Sadie L. Childs
*Attorney, Agent, or Firm*—Fleit & Jacobson

[57] ABSTRACT

A method for producing a mica based insulation is disclosed. The method comprises the steps of solubilizing a poly (carborane siloxane) containing carborane moieties linked by siloxy groups in a suitable solvent at a loading varying from 20 to 50% by weight of polymer on total weight of the solution, placing a mica sheet of desired thickness on a suitable support, impregnating the supported mica sheet with the solution so as to achieve complete wetting, and curing the impregnated mica sheet by oxidative crosslinking of the polymer for a predetermined time interval and at a predetermined temperature above which oxidative crosslinking of the polymer becomes significant.

8 Claims, 1 Drawing Figure

METHOD FOR PRODUCING A MICA BASED INSULATION

Figure 1:
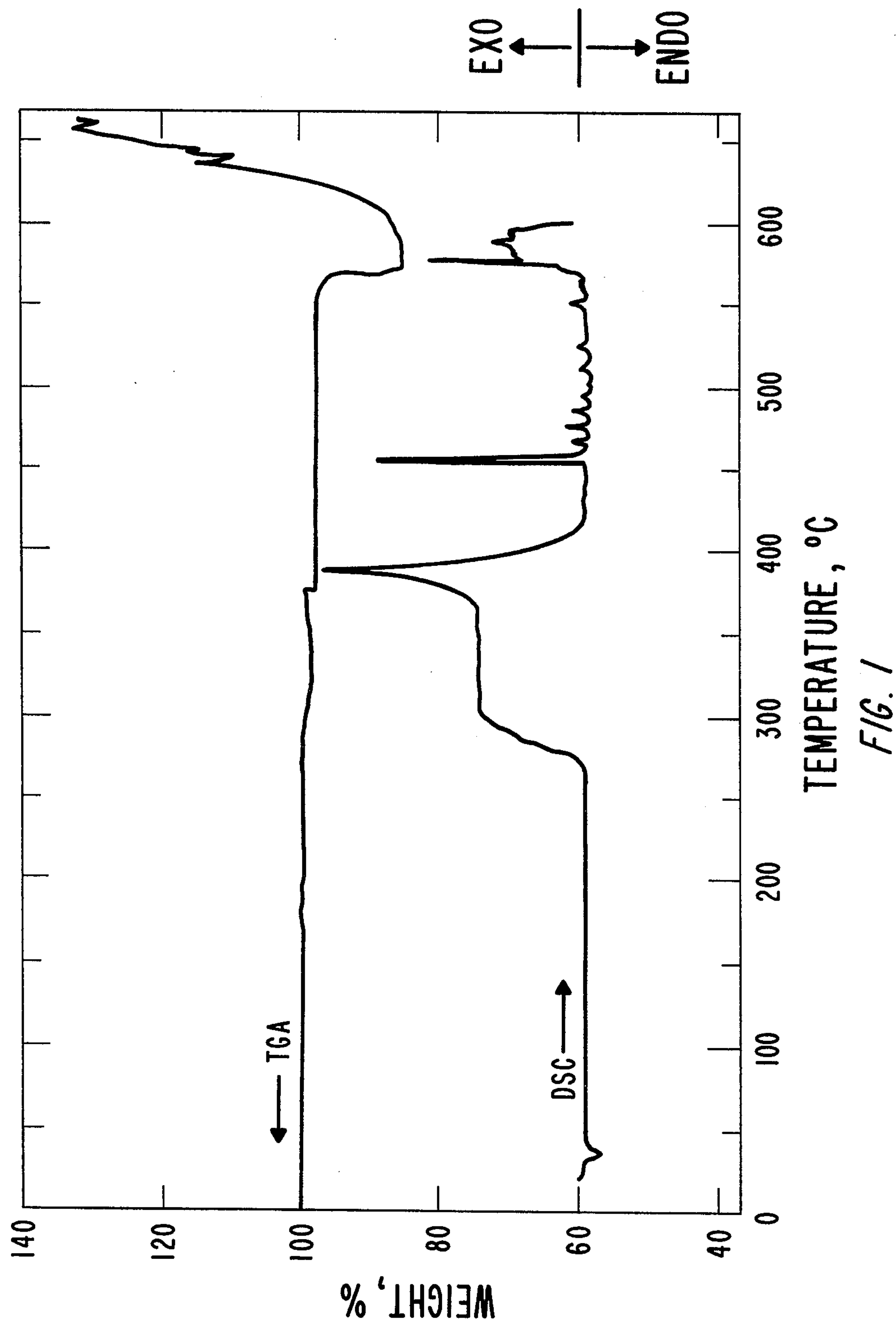

This is a continuation-in-part of application Ser. No. 488,408 filed July 15, 1974 now U.S. Pat. No. 3,989,875.

This invention relates to a method of producing a mica based insulation.

Mica has long been known to have outstanding dielectric properties. In single platelet form, however, it is extremely rigid and is suitable only for use as support for conductive or resistive wiring. Mica may be delaminated by various means, and the resulting small platelets segregated and reconstituted to form relatively flexible thin sheets known as mica paper. This practice is becoming increasingly important as supplies of good quality mica plate are becoming exhausted. There is also a small production of paper and composite using synthetic mica artificially made by various means. Mica paper relies for its physical integrity upon secondary attractive forces between adjacent platelets, at the atomic level. As a result, mica paper is very fragile, and it is common practice to use an impregnant or binder to improve its handling characteristics and integrity. Among the binders employed are inorganic salts and organic polymers.

Combining inorganic salts with mica paper results in a composite which is virtually as rigid as mica plates, limiting its usefulness to electrical supports, etc. Fabrication of salts impregnated mica paper is a costly and tedious process involving high temperatures and pressures to achieve optimum performance. However, most of these materials do have outstanding thermal stability at or above 1,000° F.

Virtually any organic polymer is suitable as a binder for mica paper. However, for relatively high temperature service, only poly (organo-siloxanes) are claimed to have good thermal stablity and retention of physical properties. They are not generally recommended for service at or about 800° F.

It is the object of the present invention to provide a mica based insulation which is fairly easy to manufacture, which has good performance properties at normal service temperatures of less than, e.g., 250° F, and which has significant retention of service properties after repeated exposures to temperatures above 1000° F.

The method of producing the mica based insulation, in accordance with the invention, comprises the steps of solubilizing a poly (carborane siloxane) containing carborane moieties linked by siloxy groups in a suitable solvent at a loading between 20 and 50% by weight of polymer on total weight of the solution, placing a mica sheet of desired thickness on a suitable support, impregnating the supported mica sheet with the solution so as to achieve complete wetting, and curing the impregnated mica sheet by oxidative crosslinking of the polymer for a predetermined time interval and at a predetermined temperature schedule above which oxidative crosslinking of the polymer becomes significant.

It has been found more advantageous to use a predrying step combining a period of time at 100° C followed by 200° C to effect total solvent removal, as this minimizes blistering of the impregnated mica by entrapped solvent. A preferred curing schedule in air is 15 minutes at 100° C, followed by 30 minutes at 200° C to remove all solvents and then 30 minutes at a temperature above which oxidative crosslinking becomes significant but below which oxidative crosslinking becomes catastrophic as determined by differential scanning calorimetry.

It was also found that a further period of heat aging of the impregnated sheet after cure at between 100° and 400° C for between 1 and 24 hours resulted in improved properties.

Alternatively, it was found that improved properties were obtained when the carborane siloxane polymers used as impregnants were heat aged in air at a temperature between 100° and 500° C for a period of time between 1 and 24 hours before being solubilized for use. After impregnation with a heat aged polymer, the impregnated mica sheet could be exposed to the preferred heat cure either with or without subsequent heat aging.

Suitable solvents are ethers, chlorinated hydrocarbons, aromatics and mixtures thereof. It is to be noted that such polymers are not soluble in water and/or alcohols. This is convenient because water and alcohols, when used with reconstituted mica sheets, cause disintegration of the laminations and render incorporation of the polymer very difficult.

The solid loading is preferably 30% by weight of polymer on total weight of the solution with xylene as the major constituent of the solvent.

The weight pick-up of polymeric material after curing and optional heat aging is between 2 and 25% by weight on total weight of impregnated mica, and preferably between 6 and 12%.

During experimentation, the mica paper used was a two thousandths of an inch thick reconstituted sheet known under the trademark Samica 4200 and sold by 3M Company. It will be understood that the invention is not limited to this paper and it is expected that any reconstituted mica sheet of any desired thickness may be used.

Surprisingly, it was found that, although carborane siloxane polymers are cited for service to a maximum of 1,000° F, beyond which significant deterioration of properties could be expected, when these polymers were combined with mica in the manner herein described, a composite sheet was formed which retained a significant proportion of its properties after repeated exposure to 1,250° F in air.

Some of the carborane siloxane materials that have been found particularly good as impregnating materials for reconstituted micaceous sheets include decarborane siloxane polymers such as the ones known under the trademark Dexsil and sold by Olin Mathieson Company, pentaborane siloxane polymers such as the ones known under the trademark Pentasil and sold by Chemical Systems Inc., and mixed meta- and para-decaborane siloxane polymers such as the ones known under the trademark Ucarsil and belonging to Union Carbide Corporation. Copolymers of deca- and penta-borane siloxane polymers as well as physical combinations of deca- and penta-borane siloxane polymers have also been advantageously used.

The invention will now be disclosed, by way of example, with reference to experiments done with various carborane siloxane polymers and with reference to FIG. 1 which illustrates thermogravimetric analysis and differential scanning calorimetry curves for a decaborane siloxane known under the trademark Dexsil 300.

Actual weight loss and heat change curves for the decaborane siloxane Dexsil 300 have been derived by thermogravimetric analysis (TGA) and differential scanning caorimetry (DSC) respectively and are shown in FIG. 1. The heat rate was 10° C/min in air.

Thermogravimetric analysis relates weight loss versus time as a function of temperature. For Dexsil 300, it can be seen that onset of weight loss begins at about 245° C and continues slowly until approximately 545° C for a total of 2% loss. At this point, catastrophic loss occurs until a total of 15% of the original weight is lost, and then slow recovery begins until the sample finally weighs 134% of the original. Considering the DSC curve for Dexsil 300, it can be seen that the onset of exothermic reaction begins at approximately 255° C, peaking at 390° C where catastrophic thermal events begin and continue to the end of the run.

Interpreting these curves in light of the molecular configuration and thermal sensitivity of this polymer, it can be said that oxidative scission and crosslinking through the siloxy methyl group begins at about 250° to 260° C, with a very gradual weight loss as the pickup of oxygen virtually matches the loss of methyl groups. This process is very energetic thermodynamically. Fragmentation of the siloxy side chains and crosslinking begins at about 450° C followed by rearrangement of the boron cage at approximately 550° C which is accompanied by an initial massive weight loss followed by heavy oxygen pickup by the boron atoms at greater than 575°-600° C. Although the details of this interpretation may be subject to some argument, it is believed that this is the general mechanism of thermal change.

Similar curves may be derived for meta- and para-decaborane siloxane polymers, such as the Ucarsil and the pentaboranes such as the Pentasil. The weight loss and heat change results are collated in the following Tables 1 and 2 respectively.

but the pentaborane siloxanes tend to remain stable after that event.

Within the polymer species, the effect of one extra siloxy group on the side chain such as found in Dexsil 300 as compared to the Ucarsil is to begin the onset of weight loss at a lower temperature with a resultant higher overall weight loss. Addition of a further siloxy group with the additional protection of a phenyl ring, (Dexsil 400ϕ), results in approximately equivalent temperatures of weight loss but a lower overall weight loss than for a Dexsil 300 polymer. Oxidative crosslinking and rearrangement is also retarded in comparison to the Dexsil 300. However, further stabilizing a Ucarsil polymer with a phenyl group serves to retard the onset of oxidation and catastrophic rearrangement to a significant degree.

Considering the pentaborane siloznes, neither increasing the number of siloxy groups in the side chain as in the Pentasil 15 nor attempting to disrupt the crystallinity of the chains, as in Pentasil 10D, has any significant effect on weight change or oxidative resistance. Overall, however, the pentaborane siloxanes tend to be more stable at extremely high temperatures, when comparing molecular rearrangement, than do the decaborane siloxanes.

After impregnation, several mica-polymer composite sheets were evaluated for flexibility, visual appearance, handling properties, abrasion resistance, tensile strength and dielectric breakdown. They were then exposed to a test cycle which evaluated moisture absorption and weight change. This cycle was as follows: 1.— Hold sample at 200° C to constant weight. 2.— Expose to 100% relative humidity at 25° C for 1 hour, weigh. 3.— Expose to 1,250° F for 1 hour, cool 5 minutes, re-expose to 1,250° F for 1 hour, cool at 0% relative humidity at 25° C, weigh. 4.— Expose to 100% relative humidity at 25° C for 2 hours, weigh. The values are reported in the following Table III as moisture pick-up both before and after high temperature exposure, and overall weight change. The tensile strength of the sheets was also de-

TABLE I

| Material | Onset of weight loss ° C | Temperature of catastrophic weight loss ° C | Total weight loss | Final weight as a function of original |
|---|---|---|---|---|
| Dexsil 300 | ~250 | ~550 | 14% | 134% |
| Dexsil 400 ϕ | ~225 | ~500 | 12% | 88% |
| All Methyl Ucarsil | ~350 | ~560 | 5% | 95% |
| Phenyl Methyl Ucarsil | ~350 | ~535 | 6% | 94% |
| Pentasil 10 | ~150 | None | 9% | 91% |
| Pentasil 15 | ~175 | None | 10% | 90% |
| Pentasil 10D | ~150 | None | 10% | 90% |

TABLE II

| Material | Onset of oxidative crosslinking ° C | Peak of oxidative crosslinking ° C | Temp. of initial catastrophic ° C | Nature of thermal events between rearrangements | Temp. of final catastrophic rearrangement ° C |
|---|---|---|---|---|---|
| Dexsil 300 | ~250 | ~390 | 450 | Excited | ~565 |
| Dexsil 400 ϕ | ~275 | ~440 | ~510 | Excited | None, continuous |
| All Methyl Ucarsil | ~250 | ~390 | ~425 | Excited | None, continuous |
| Phenyl Methyl Ucarsil | ~310 | ~470 | ~565 | Stable | None, stable to end |
| Pentasil 10 | ~210 | ~325 | 510 | Stable | None, stable to end |
| Pentasil 15 | ~200 | ~330 | 485 | Stable | None, stable to end |
| Pentasil 10D | ~215 | ~335 | 490 | Stable | None, stable to end |

To summarize the results briefly, the temperature of onset of weight loss and oxidative crosslinking tends to be higher for decaborane polymers than pentaborane polymers. Decaborane polymers undergo a very high temperature massive weight change, while pentaborane polymers remain stable. Onset of oxidative crosslinking and pack oxidative crosslinking temperatures for decaborane siloxanes is higher than for pentaborane siloxanes. Initial catastrophic rearrangement for all the polymers occurs at approximately similar temperatures, termined after exposing samples to 1,250° F for 1 hour. Dielectric strength measurements were made, using a DC source and ¼ inch electrodes in air after conditioning for 16 hours at 25° C/50% relative humidity. Concurrently, and for purposes of comparison only, samples were evaluated which had been impregnated to approximately the same weight pick-up using a poly (organosiloxane) known under the trademark DC 935, a product of the Dow Corning Company. The results of the experiments may be found in the following Table III:

TABLE III

EVALUATION OF POLY (CARBORANE SILOXANE) IMPREGNATED 0.002 in. MICA SHEET

| Sample | Impregnant | Cure (a) ° C | Weight Pick up of impregnant, % | Weight Changes in Exposure Cycle, % (b) 1 | 2 | 3 | (c) | Changes In Physical Properties: Flexure (1) | Flexure (2) | Handling | Abrasion Resistance | Tensile Strength lb./in. Width | Dielectric Breakdown Voltage, KV, DC |
|---|---|---|---|---|---|---|---|---|---|---|---|---|---|
| 1 | Dow Corning 935, 25% w/w in xylene | 30'/100<br>30'/275 | 8.5 | +0.12 | +1.08 | −4.08 (h) | Before<br>After | 10<br>1 | 10<br>0* | 8<br>3 | 8<br>8 | 16.0<br>8.0 | 2.46<br>2.35 |
| 2 | Dexsil 300 30% w/w in xylene | 15'/100<br>30'/200<br>30'/300 | 8.9 | +0.43 | +2.65 | −0.07 | Before<br>After | 10<br>2 | 10<br>1** | 10<br>8 | 10<br>8 | 11.5<br>14.0 | 2.33<br>2.70 |
| 3 | Dexsil 300 30% w/w in xylene | 15'/100<br>30'/200<br>30'/300<br>240'/200 | 8.5 | +0.24 | +2.34 | −0.18 | Before<br>After | 10<br>2 | 10<br>2** | 10<br>10 | 10<br>10 | 19.5<br>22.0 | 2.83<br>2.76 |
| 4 | Dexsil 300 Heat aged 1 hr./300° C 30% w/w in xylene | 15'/100<br>30'/200<br>30'/300 | 9.8 | +0.32 | +2.96 | +0.24 | Before<br>After | 10<br>2 | 10<br>1** | 10<br>10 | 9<br>10 | 15.0<br>19.5 | 2.82<br>2.58 |
| 5 | Dexsil 300 Heat aged 1 hr./300° C 30% w/w in xylene | 15'/100<br>30'/200<br>30'/300<br>240'/200 | 10.6 | 0 | +3.11 | +0.24 | Before<br>After | 10<br>2 | 10<br>1** | 10<br>9 | 9<br>10 | 15.0<br>25.0 | 2.07<br>2.20 |
| 6 | Ucarsil (modified) (e) 20% w/w in 45% xylene 35% methylene chloride | 15'/100<br>30'/200<br>30'/300 | 11.17 | +2.08 | +7.16 | −0.08 | Before<br>After | 10<br>10 | 10<br>3 | 10<br>10 | 10<br>10 | 29.0<br>24.0 | 4.32<br>3.38 |
| 7 | Ucarsil (modified) (f) 20% w/w in xylene | 15'/100<br>30'/450 | 9.16 | +6.48 | +7.66 | −1.46 | Before<br>After | 10<br>10 | 10<br>3 | 10<br>10 | 10<br>10 | 24.0<br>15.5 | 3.75<br>3.30 |
| 8 | Dexsil 400-ϕ 30% w/w in xylene | 15'/100<br>30'/350 | 11.25 | +1.18 | +2.55 | −1.65 | Before<br>After | 10<br>10 | 10<br>4 | 10<br>10 | 10<br>10 | 33.0<br>38.5 | 4.23<br>2.88 |
| 9 | Pentasil 10, 30% w/w in xylene | 15'/100<br>30'/200<br>30'/300 | 7.81 | +2.27 | +1.09 | −0.98 | Before<br>After | 10<br>9 | 10<br>3 | 10<br>10 | 10<br>10 | 38.0<br>24.0 | 3.81<br>3.45 |
| 10 | Pentasil 10D, 30% w/w in xylene | 15'/100<br>30'/250 | 9.91 | +0.80 | +2.68 | −0.69 | Before<br>After | 10<br>10 | 10<br>2 | 10<br>10 | 10<br>10 | 33.0<br>27.0 | 4.36<br>3.18 |
| 11 | Pentasil 15, 30% w/w in xylene | 15'/100<br>30'/250 | 11.6 | +0.13 | +3.65 | −0.97 | Before<br>After | 10<br>10 | 10<br>8 | 10<br>10 | 10<br>10 | 32.0<br>28.5 | 3.96<br>2.64 |
| 12 | Dexsil 300, (g), 30% w/w in xylene | 15'/100<br>30'/300 | 11.0 | +0.04 | +4.52 | −0.04 | Before<br>After | 10<br>10 | 10<br>8 | 10<br>8 | 10<br>10 | 30.5<br>38.0 | 4.56<br>4.88 |

*Disintegrated by flaking on flexure.
**Clean break, no flaking.
(a) Consecutive cure cycles.
(b) 1. Initial moisture pickup
2. Moisture pick up after 1,250° C exposure
3.Overall weight loss or gain.
(c) Rated before and after exposure to test cycle.
(d) Rated 10 best, 0 worst. Flexure (1) = number of times strip could be folded over 360° without failure; Flexure (2) = number of times strip could be folded over an 0.08 in. diameter wire without failure. Handling = general resistance to manipulation. Abrasion resistance = resistance to abrasion by blunt object.
(e) Mixed m-p carborane siloxane polymer whose side chain substituents are all methyl groups.
(f) Mixed m-p carborane siloxane polymer whose side chain substituents are both methyl and phenyl.
(g) Preheatagèd for 2 hours at 200° C before making up solution; cure cycle mirrors preferred embodiment.
(h) Heavy fuming occurred during thermal exposure, coating the sample holder. Removing the condensed fume resulted in an overall weight loss of >10%.

It will be seen from the above Table III that, after exposure to a temperature of 800° F and higher, the impregnated micaceous sheet, in accordance with the invention, has, in comparison to prior art compositions such as poly (organosiloxane):

a. a significantly lower weight loss;
b. a significantly higher level of physical integrity, abrasion resistance and flexibility;
c. a superior tensile strength;
d. superior dielectric properties; and
e. no significant outgassing or sublimation.

Sample 3 was made to evaluate the effect of post cure aging. It was found that this approach gave slightly improved tensile properties while the other sample characteristics were relatively the same as impregnated samples cured in the normal manner.

Samples 4 and 5 were made to evaluate the effect of polymer pre heat aging, prior to use of the polymers as an impregnant. It was found that the samples had good tensile strength and handling properties, both before and after exposure to 1,250° F.

Sample 7, when compared to sample 6, illustrates the effect of curing near the peak of oxidative crosslinking (470° C for that material as shown in Table II) instead of at the onset of oxidative crosslinking as proposed in the present application. It will be noted that curing at 450° C immediately after the initial 100° C level, instead of at the preferred curing cycle used for sample 6, resulted in a significantly higher weight loss and a substantially higher initial moisture pick-up. The physical properties did not change but the tensile strength and the dielectric properties of the material were lower both before and after exposure to a temperature of 1,250° C. Similarly, it was also noted that the properties of the poly (carborane siloxane)/mica composite were not as good when curing was done at a temperature lower than the onset of oxidative crosslinking (i.e., ~200° C maximum).

While the main application of the above disclosed composite is intended for electrical insulation at high temperature, it is to be understood that it may be used independently for electrical insulation or for thermal insulation. What is claimed is:

1. A method of producing a mica based composite comprising the steps of:

(a) solubilizing a poly (carborane siloxane) containing carborane moieties linked by siloxy groups in a suitable solvent at a loading between 20 and 50% weight by weight of total solution to form a solution consisting essentially of said poly (carborane siloxane) and said solvent;

(b) placing a mica sheet of a desired thickness on a support;

(c) impregnating the supported mica sheet with the solution so as to achieve complete wetting; and (d) curing the impregnated mica sheet by oxidative crosslinking for a predetermined time interval and at a predetermined temperature above which oxidative crosslinking of the polymer becomes significant, but below which oxidative crosslinking becomes catastrophic, as determined by differential scanning calorimetry.

2. The method as defined in claim 1, wherein the impregnated mica sheet is cured in air for a period of time at 100° and 200° C sufficient to effectively remove all solvent, followed by a selected period of time at a temperature above which oxidative crosslinking becomes significant.

3. The method as defined in claim 2, wherein the impregnated mica sheet is cured in air for 15 minutes at 100° C and 30 minutes at 200° C to remove all solvent, followed by 30 minutes at a temperature above which oxidative crosslinking becomes significant.

4. The method as defined in claim 1, and further comprising the step of heat aging the impregnated mica sheet after curing, at between 100° and 400° C for between 1 and 24 hours.

5. The method as defined in claim 1, and further comprising the step of partially crosslinking the polymer at between 100° and 500° C for between 1 and 24 hours before solubilization of the polymer.

6. The method as defined in claim 1, wherein the solvent is selected from the group consisting of ethers, chlorinated hydrocarbons, aromatics and mixtures thereof.

7. The method as defined in claim 6, wherein the major part of the solvent is xylene.

8. The method as defined in claim 1, wherein the poly (carborane siloxane) is used as a 30% weight by weight solution.

* * * * *